Patented June 17, 1952

2,600,637

UNITED STATES PATENT OFFICE 2,600,637

MATERIALS FOR USE IN PACKING EGGS

Abraham Goldrei, London, England

No Drawing. Application April 1, 1949, Serial No. 85,023. In Great Britain May 18, 1948

7 Claims. (Cl. 99—177)

This invention relates to improved materials for use in the packing of eggs, and has for its object a betterment for such purpose, whereby the material acts as an insulator against the effects of atmospheric changes and humidity, therefore tending to prevent the eggs becoming tainted and additionally providing immunity from any musty taste or like latent deterioration for a considerable period.

Heretofore it has been the practice to pack eggs from producing countries for export by ship or rail as well as to place quantities in cold stores for a period prior to consumption or subsequent shipment elsewhere. Normally eggs are packed in boxes of 3 or in cases of 6 to 12 long hundreds, the packing material in boxes with fillers and flats made of wood pulp or in cases with wood wool. In some instances rice husks are added, or constitute the sole internal packing, but since all these substances are moisture absorbent and of an organic character, the changes set up by variations of atmospheric conditions i. e. heat and humidity whilst in transit and where eggs are stowed in holds of the steamer with no refrigeration facilities causes the said packing material in contact with the eggs to deteriorate and turn moist and damp causing in turn rapid deterioration of the egg internal substances, and producing partial or total putrefaction or kindred troubles although no shrinkage of the egg substance may have taken place.

It is also well not to overlook the fact that fresh eggs containing the full amount of albumen and moisture when confined into closed space are most susceptible to mustiness.

Further, during any transition period which may be of 10 to 14 days from the time the egg cases leave the cold storage chamber until the eggs are consumed, any external high temperature causes atmospheric condensation, and this moisture has an immediate adverse effect on the eggs. The present invention is designed to avoid the disadvantages attendant upon the packing material hitherto in use, by providing a comminuted and mildly elastic substance in intimate admixture with an inorganic powdered material, the latter having latent preservative properties, which said admixture is added to each packing case as an addition to the usual or normal packing.

The invention consists in providing an improved material for use in the packing of eggs, wherein the dried vegetable known as lycopodium in comminuted form is admixed with powdered boracic acid or borax and the said mixture applied to the eggs and packing in such manner as to constitute a buffer material between the eggs and the packing material.

In carrying the invention into effect the boracic acid or borax is first passed through a sieve to eliminate lumps and then admixed with natural pulverised lycopodium, the proportions being:

| | Per cent by weight |
|---|---|
| Boracic acid or borax | 80 |
| Lycopodium | 20 |

The admixed material so prepared and maintained in a dry state is sprinkled on layers of eggs in the course of packing at the preferred rate of 1½ ozs. per 120 eggs. The admixed powder is only slightly hygroscopic but does not generate heat or decompose. Its application has a marked cooling effect and any eggs covered with the admixture tend to resist wetting or dampness and this characteristic effect retards mould and bacterial growth.

As an example of the effectiveness of the invention two boxes were taken at random from a bulk consignment of Chinese eggs landed at a London cold store on July 12th, one box was marked with the letter "A" and treated with applied borax and lycopodium admixture in the proportion stated above, and the said box was then closed, bound with string and sealed with seals of A. Goldrei and another firm of egg importers.

The second box in the original state remained unopened and was marked with the letter "B."

The two boxes in question were placed in a London public cold store on September 13th. On January 20th of the following year the two boxes were opened by a well known London egg surveyor in the presence of two representatives of a Tooley Street firm, also a representative of the cold store and A. Goldrei. The surveyor found by candle test that the eggs in the treated box "A" were in excellent condition with none bad. Two marked "cracked" when the box was opened were still sound on candle test. All the eggs showed evaporation marks, but no double marks were found as would be the case with stale or overstored eggs. Six of the eggs were taken by the surveyor for further tests, two being boiled soft and tested, and were found to be sound and free of any objectionable flavour or taste, whilst some of the others were used for making custard which was perfect in every way.

The eggs in the original box "B" were definitely inferior in quality, fifteen were bad, three of them being black and very many of the other when submitted to the candle test showed that they could not pass the candle again in a few weeks' time, the packing material in the parts where the bad eggs were found was already somewhat damp and musty.

It will be seen that since both lycopodium and boracic acid or borax are odourless and substantially colourless the material has no adverse colour effect upon the eggs themselves whether in transit or cold storage, and the effect of application is their preservation in a fresh condition for a much longer period than has hitherto been found possible.

I claim:

1. Material for use in packing eggs comprising a mixture of approximately 20% lycopodium by weight and 80% by weight of material of the group consisting of borax and boracic acid.

2. An improved material for use in packing eggs consisting of a powder in the preferred proportion of approximately 80% by weight of borax powder and 20% by weight of lycopodium.

3. An improved material for use in packing eggs consisting of a powder in the preferred proportion of approximately 80% by weight of boric acid powder and 20% by weight of lycopodium.

4. An improved method of packing eggs consisting in sprinkling on said eggs during packing a mixture of a powder in the proportion by weight of approximately 80% of borax powder and 20% of lycopodium.

5. An improved method of packing eggs consisting in sprinkling on said eggs during packing a mixture of a powder in the proportion by weight of approximately 80% of boric acid powder and 20% of lycopodium.

6. A buffer powder used as an additive with egg-packing material comprising a mixture of approximately 80% borax powder and 20% lycopodium, by weight.

7. A buffer powder used as an additive with egg-packing material comprising a mixture of approximately 80% boric acid powder and 20% lycopodium, by weight.

ABRAHAM GOLDREI.

REFERENCES CITED

The following references are of record in the file of this patent:

UNITED STATES PATENTS

| Number | Name | Date |
|---|---|---|
| 699,258 | Stukes | Mar. 6, 1902 |
| 2,438,168 | Hearst | Mar. 23, 1948 |

FOREIGN PATENTS

| Number | Country | Date |
|---|---|---|
| 242,780 | Great Britain | Nov. 19, 1925 |

OTHER REFERENCES

"The Merck Index," 1940, fifth edition, published by Merck and Co. Inc., Rahway, New Jersey, page 326, article entitled "Lycopodium, U. S. P. XI."

"The Pharmaceutical Recipe Book," 1943, third edition, published by The American Pharmaceutical Association, page 184, article entitled "Compound Zinc Stearate Dusting Powder."